United States Patent
Kita et al.

(10) Patent No.: US 8,233,764 B2
(45) Date of Patent: Jul. 31, 2012

(54) PROGRAM RECORDING APPARATUS AND PROGRAM RECORDING METHOD

(75) Inventors: Yukinori Kita, Tokyo (JP); Shinichiro Sugai, Saitama (JP); Makoto Korehisa, Kanagawa (JP); Takayuki Miyama, Tokyo (JP)

(73) Assignee: Sony Corporation

( * ) Notice: Subject to any disclaimer, the term of this patent is extended or adjusted under 35 U.S.C. 154(b) by 1010 days.

(21) Appl. No.: 10/520,449

(22) PCT Filed: May 7, 2004

(86) PCT No.: PCT/JP2004/006506
§ 371 (c)(1),
(2), (4) Date: Jul. 7, 2005

(87) PCT Pub. No.: WO2004/100538
PCT Pub. Date: Nov. 18, 2004

(65) Prior Publication Data
US 2005/0286867 A1 Dec. 29, 2005

(30) Foreign Application Priority Data
May 7, 2003 (JP) .................................. 2003-167151

(51) Int. Cl.
H04N 5/765 (2006.01)
H04N 5/931 (2006.01)
(52) U.S. Cl. .......................................... 386/200; 386/204
(58) Field of Classification Search .................... 386/46
See application file for complete search history.

(56) References Cited

U.S. PATENT DOCUMENTS

| 6,951,031 B2 * | 9/2005 | Hatano ........................... 725/50 |
| 2001/0016944 A1 * | 8/2001 | Terakado et al. ............... 725/43 |
| 2003/0152360 A1 * | 8/2003 | Mukai et al. .................... 386/46 |
| 2004/0143622 A1 * | 7/2004 | Hirabayashi et al. ......... 709/200 |

FOREIGN PATENT DOCUMENTS

| EP | 0296190 A1 | 12/1988 |
| EP | 1292137 A1 | 3/2003 |
| GB | 2229595 A | 9/1990 |
| JP | 9-233418 A | 9/1997 |
| JP | 10-21601 A | 1/1998 |
| JP | 10-177777 A | 6/1998 |

(Continued)

OTHER PUBLICATIONS

Supplementary European Search Report, EP 04731755, dated Aug. 11, 2009.

*Primary Examiner* — William C Vaughn, Jr.
*Assistant Examiner* — Oluwaseun A Adegeye
(74) *Attorney, Agent, or Firm* — Lerner, David, Littenberg, Krumholz & Mentlik, LLP

(57) ABSTRACT

A program recording method receives and records a desired program, the recording of which is set based on at least a broadcast time period and a broadcast channel. The method includes obtaining an electronic program guide and, when the desired program recording is set, searching a character string in a predetermined region of the electronic program guide including the broadcast time and broadcast channel, and changing the broadcast time period to a new time period when a predetermined word is included in the character string. A program recording apparatus for performing the method is also provided. The program recording apparatus and method ensure that a situation does not occur in which an end portion of the desired program is not recorded.

16 Claims, 6 Drawing Sheets

FOREIGN PATENT DOCUMENTS

| | | |
|---|---|---|
| JP | 11-250526 A | 9/1999 |
| JP | P2000-41066 A | 2/2000 |
| JP | 2000-332711 A | 11/2000 |
| JP | 2001-155393 A | 6/2001 |
| JP | 2002-152639 A | 5/2002 |
| JP | 2002-185876 A | 6/2002 |
| JP | 2003-078890 A | 3/2003 |
| JP | 2004-289565 A | 10/2004 |
| WO | 8804507 A1 | 6/1988 |
| WO | 0225936 A2 | 3/2002 |

* cited by examiner

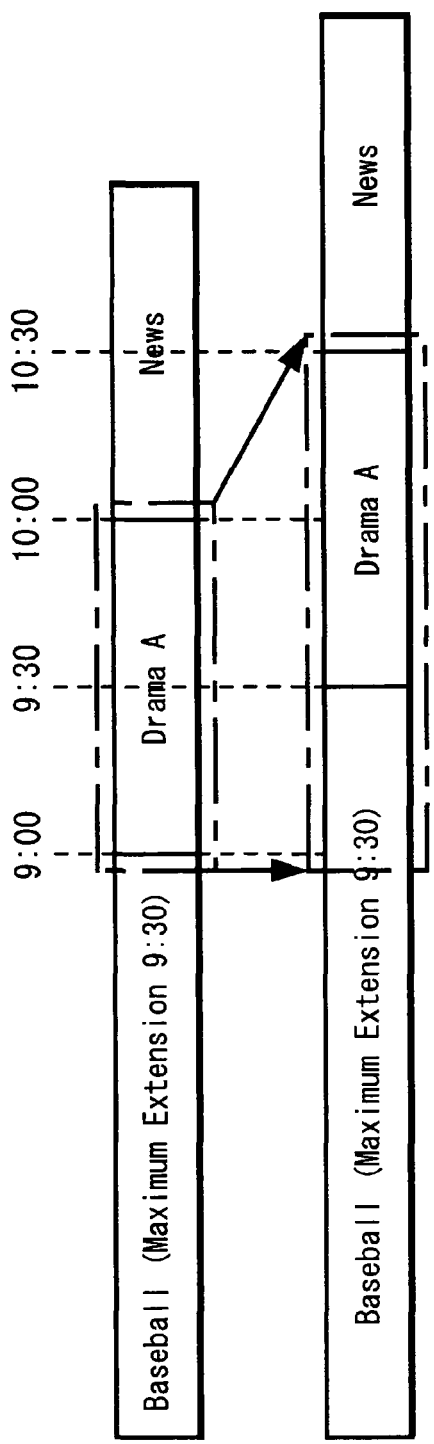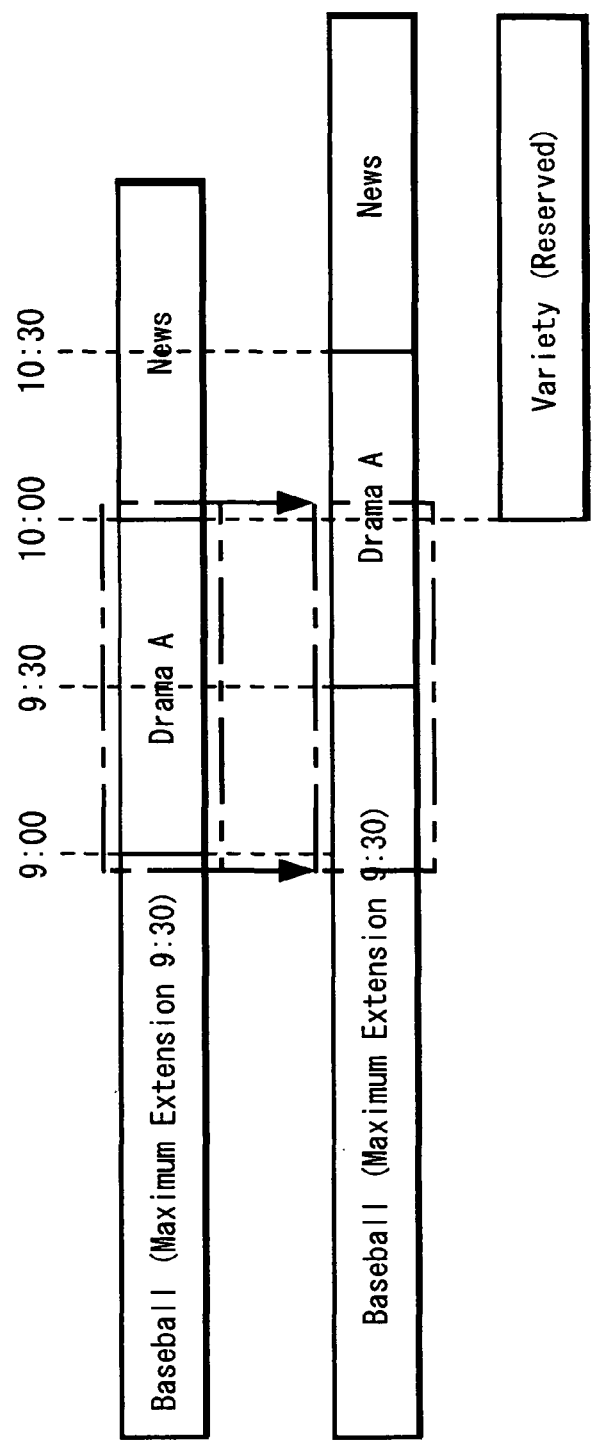
FIG. 5A
FIG. 5B

PROGRAM RECORDING APPARATUS AND PROGRAM RECORDING METHOD

The present invention relates to a program recording apparatus and a program recording method preferably used for an apparatus which is installed with, for example, a hard disk and carries out a recording of a broadcast program, and more particularly relates to a program recording apparatus and a program recording method which are preferable for a desired program recording to be carried out certainly by using an electric program guide (EPG).

A constitution disclosed in, for example, Japanese laid-open patent application No. 2000-41066 (hereinafter, referred to as patent reference 1) is known as an apparatus for receiving a desired, program in a conventional program receiving apparatus by obtaining an electric program table and by searching the electric program table according to an arbitrary keyword.

Also, a constitution disclosed in, for example, Japanese laid-open patent application No. 2002-152639 (hereinafter, referred to as patent reference 2) is known as an apparatus for receiving a program by presuming a preferred program of a user from viewing-and-listening history information of the user.

Further, a constitution disclosed in, for example, Japanese laid-open patent application No. 9-233418 (hereinafter, referred to as patent reference 3) was also proposed as an apparatus for judging an extension of a program and for recording it until the end thereof.

In an apparatus which is installed with, for example, a hard disk for recording a broadcast program, a process is carried out to obtain an electric program guide and to set a broadcast time period and a broadcast channel of a desired program by using the obtained electric program guide so as to receive and record the desired program. However, if a program, such as a professional baseball broadcast whose broadcast period is indefinite is broadcast before the desired program which is set in this manner, there is a fear that a situation may occur in which the end portion of the desired program is not recorded.

On the other hand, the aforesaid patent reference 3 discloses a technique for superimposing a specific code signal on a broadcast signal and for controlling a recording apparatus by using this code signal, but it is necessary to provide new equipment such as a code signal generation apparatus at the broadcast company in order to realize this, so that it cannot be realized easily. On the other hand, in an apparatus installed with the aforementioned hard disk so as to perform a recording, a big problem never occurs even if, for example, matters other than the desired programs are recorded before and after thereof, because the recording capacity is extremely large.

The present application was invented in view of such a matter, the problem to be solved is that in a conventional apparatus, there is a fear that a situation may occur in which an end portion of the desired program is not recorded in a case when the broadcast period of a previous program is extended and further it was not possible to realize a dissolving means thereof easily.

SUMMARY OF THE INVENTION

One embodiment of the present invention provides a program recording apparatus which obtains an electric program guide and receives and records a desired program by using the obtained electric program guide, including a setting unit operable to set a recording of the desired program based on at least a broadcast time period and a broadcast channel; a searching unit operable to search a character string in a predetermined region of the electric program guide including the set broadcast time period and broadcast channel; and a controller operable to change the set broadcast time period to a new time period when a predetermined word is included in the character string.

In this manner, it is easily possible to remove a fear that a situation may occur where an end portion of the desired program is not recorded.

Also, according to this embodiment of the present invention, the predetermined word may be "extension", so that it is possible to carry out a desired program recording corresponding to an extension of a broadcast period of the previous program.

Also according to this embodiment of the present invention, when the predetermined word is searched, a number sequence subsequent thereto is discriminated and a control for time-extending a termination point of the broadcast time period is carried out in response to the value of the discriminated number sequence, so that it is possible to carry out a desired program recording in response to a period to be extended.

The termination point of the broadcast time period may be time-extended by a predetermined amount when the number sequence subsequent to the predetermined word cannot be discriminated, so that it is possible to carry out a desired program recording even in a case when there is no indication of an extension period for the previous program.

The controller does not change the set broadcast time period to the new time period when the new time period overlaps with another set broadcast time period, so that a situation where another picture-record reserved program is not to be recorded can be avoided.

When the set broadcast time period is not changed, the controller causes a display to be made indicating that the set broadcast time period was not changed in addition to a display of the desired program set for recording, so that misunderstanding of a person to use (user) does not occur.

The setting unit further sets the change from the set broadcast time period to the new time period when the predetermined word is included in the character string, so that an excellent program recording can be always carried out.

The embodiment according to the present invention may further include a display for displaying a logo indicating that the change from the set broadcast time period to the new time period has been set, so that an excellent program recording can be always carried out.

The controller may change the set broadcast time period to the new time period just before the desired program recording starts when the predetermined word is included in the character string, so that an excellent program recording can be always carried out.

The controller does not change the set broadcast time period to the new time period when the program recording apparatus would have an insufficient capacity at the new time period, so that an excellent program recording can be always carried out.

Another embodiment of the present invention provides a program recording method for receiving and recording a desired program the recording of which is set based on at least a broadcast time period and a broadcast channel, the method including obtaining an electric program guide; in a situation when the desired program recording is set, searching a character string in a predetermined region of the electric program guide including the set broadcast time period and broadcast channel; and changing the set broadcast time period to a new time period when a predetermined word is included in the character string.

In this manner, it is easily possible to remove a fear that a situation may occur where an end portion of the desired program is not recorded.

When the predetermined word is searched, a number sequence subsequent thereto may be discriminated and a control for time-extending a termination point of the broadcast time period may be carried out in response to the value of the discriminated number sequence, so that it is possible to carry out a desired program recording in response to a period to be extended.

The termination point of the broadcast time period may be time-extended by a predetermined amount when the number sequence subsequent to the predetermined word cannot be discriminated, so that it is possible to carry out a desired program recording even in a case when there is no indication of an extension period for the previous program.

The step of changing the set broadcast time period to the new time period is not carried out when the new time period overlaps with another set broadcast time period, so that a situation where another picture-record reserved program is not to be recorded can be avoided.

The method according to this embodiment of the present invention may further include displaying an indication that the step of changing the set broadcast time period to the new time period was not carried out along with the desired program set for recording when the step of changing the set broadcast time period is not carried out, so that misunderstanding of a person to use (user) does not occur.

The setting step may further include setting the change from the set broadcast time period to the new time period when the predetermined word is included in the character string, so that an excellent program recording can be always carried out.

The method according to this embodiment of the present invention may also include displaying a logo indicating that the change from the set broadcast time period to the new time period has been set when the predetermined word is included in the character string, so that an excellent program recording can be always carried out.

The changing step may include changing the set broadcast time period to the new time period just before the desired program recording starts when the predetermined word is included in the character string, so that an excellent program recording can be always carried out.

The step of changing the set broadcast time period to the new time period is not carried out when an insufficient recording capacity would exist at the new time period, so that an excellent program recording can be always carried out.

BRIEF DESCRIPTION OF THE DRAWINGS

FIGS. 5A and 5B are diagrams to be used for the explanation of the operation thereof.

DETAILED DESCRIPTION

According to the present invention, a character string in a predetermined region of an electric program guide is searched and a set broadcast time is to be changed when a predetermined word is included in the character string, and accordingly, it is easily possible to remove the fear that a situation may occur in which an end portion of a desired program is not recorded.

Figure 1:
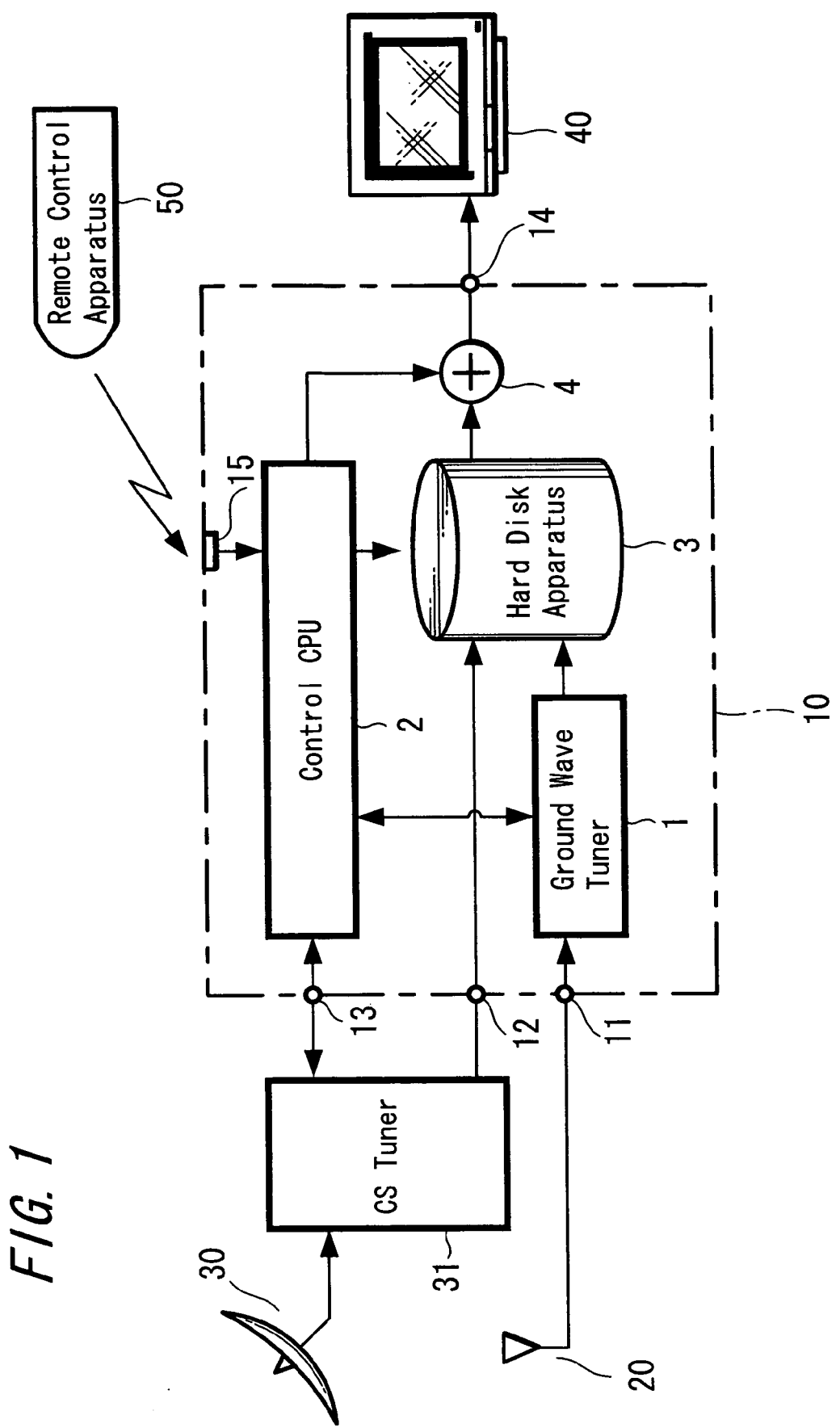
FIG. 1 is a block diagram showing the constitution of one exemplified embodiment of a program recording apparatus for performing a program recording method according to the present invention.

Hereinafter, the present invention will be explained with reference to the drawings, wherein FIG. 1 is a block diagram showing the constitution of one exemplified embodiment of a program recording apparatus for performing a program recording method according to the present invention.

In FIG. 1, a program recording apparatus 10 shown in this exemplified embodiment is installed with a receiving tuner 1 of a so-called ground wave broadcast (hereinafter, referred to as a ground wave tuner in short) and this ground wave tuner 1 is supplied with a receiving signal from a receiving antenna 20 of a ground wave broadcast (hereinafter, referred to as a ground wave antenna in short) which is connected to an antenna terminal 11.

Also, a receiving signal from a receiving antenna 30 for a so-called satellite (CS) broadcast (hereinafter, referred to as a satellite antenna in short) is supplied to an externally attached receiving tuner 31 for a satellite broadcast (hereinafter, referred to as a CS tuner in short), and a digital data signal which is received and demodulated and further a decoded analog television signal are taken out.

Further, the analog television signal taken out from the externally attached CS tuner 31 is supplied to an analog input terminal 12 of the program recording apparatus 10, and at the same time the digital data signal taken out from the CS tuner 31 is supplied to a data input terminal 13 of the program recording apparatus 10.

Then, the digital data signal supplied to the data input terminal 13 is supplied to a control CPU (Central Processing Unit) 2 and, for example, electric program guide (Electric Program Guide: hereinafter, referred to as an EPG in short) data which is included in the digital data signal is obtained so as to form an electric program guide.

Further, superimposed EPG data are also taken out from the analog television signal which is received and demodulated in the ground wave tuner 1 installed in the program recording apparatus 10 and are supplied to the control CPU 2. An electric program guide is also formed with respect to the EPG data of this ground wave.

Then, for example, a broadcast time period, a broadcast channel and the like of a desired program to be recorded are set by using the formed electric program guide and a hard disk apparatus 3 to be used as a memory means is driven in response to that set content and at the same time, control signals of channel selection or the like are supplied to the installed ground wave tuner 1 and the externally attached CS tuner 31.

In this manner, a video signal, an audio signal and the like of the television signal which is received, demodulated and decoded in the installed ground wave tuner 1 and the externally attached CS tuner 31 are recorded in the hard disk apparatus 3. It should be noted that well-known A/D and D/A conversions or the like are carried out for recording and reproducing in the hard disk apparatus 3, but drawings of the converters therefor are omitted.

Further, the video signal, audio signal and the like of the television signal recorded in the hard disk apparatus 3 are reproduced according to the control of the control CPU 2 and are taken out at an output terminal 14 through a mixer 4. Then, the signals taken out at the output terminal 14 are supplied to a receiver 40 so as to display the video signal, reproduce the audio signal and the like.

Also, a picture of the electric program guide and a picture of another operation guide which are formed in the control CPU 2 are supplied to the mixer 4 so as to be superimposed with the reproduced video signal from the hard disk apparatus 3. Thus, the pictures of the electric program guide, the operation guide and the like are displayed on the picture screen by being superimposed with the video signal received by the receiver 40.

Control of the program recording apparatus 10 is carried out by using a remote control apparatus 50 with or without looking at the pictures of the electric program table, the operation guide and the like. It should be noted that the control is carried out after the signal from the remote control apparatus 50 is received by a remote control receiver 15 and the received signal is supplied to the control CPU 2.

Figure 2A:
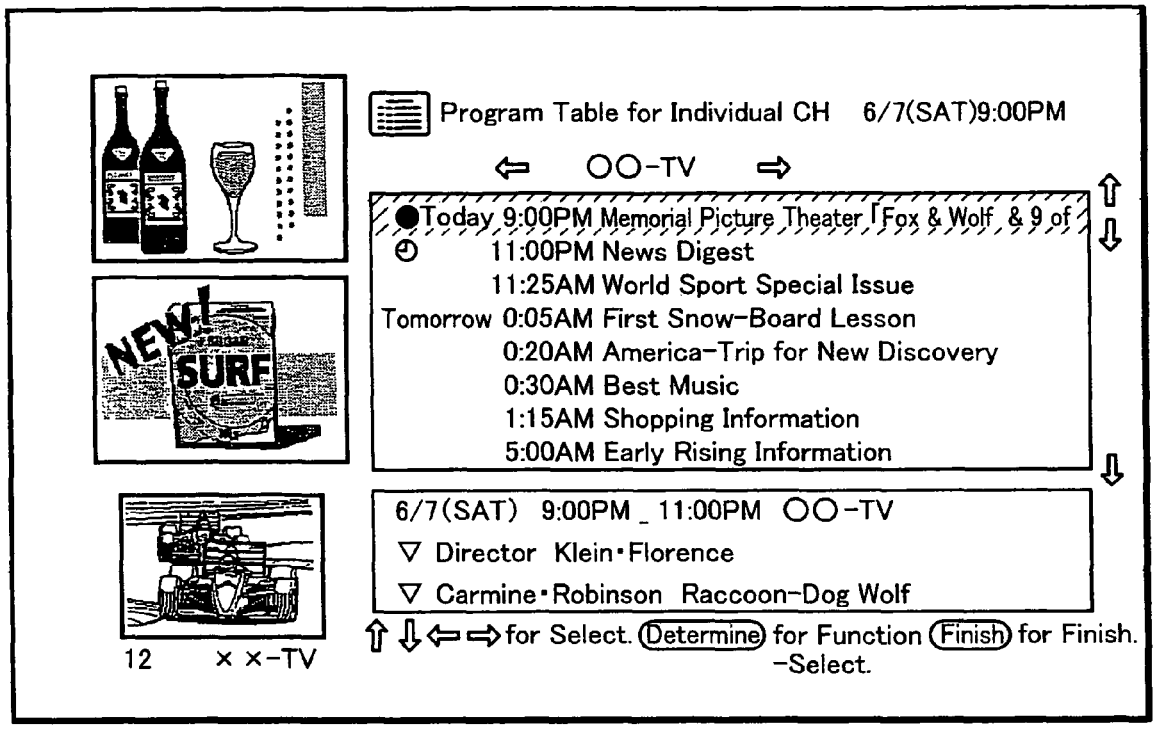
FIGS. 2A and 2B are diagrams showing pictures of electric program guides to be used for the explanation thereof.

Then, in such a program recording apparatus 10, a picture of an electric program guide such as shown, for example, in FIG. 2A is displayed in the receiver 40 when EPG data are obtained and an electric program guide is formed. More specifically, in FIG. 2A, the current date and time are displayed at an upper portion on the right side of the picture screen and at the same time, programs of an arbitrary broadcast station (channel) after that time point are displayed.

Also, on the left side of the picture screen, arbitrary commercial messages and a picture of a received signal of the presently selected channel are displayed. Further, at a lower portion of the picture screen, a commentary on the program selected by a cursor and an operational guide, for example, of the remote control apparatus 50 are displayed. Here, the commentary on the program is a portion of the EPG data.

More specifically, the selection of a broadcast station (channel) shown by right and left arrows and a program shown by upper and lower arrows on this picture screen is carried out by operating a four-directional cursor key (not shown) provided, for example, in the remote control apparatus 50. Then, the selection of a desired program is determined by an operation of a determination key.

Figure 2B:
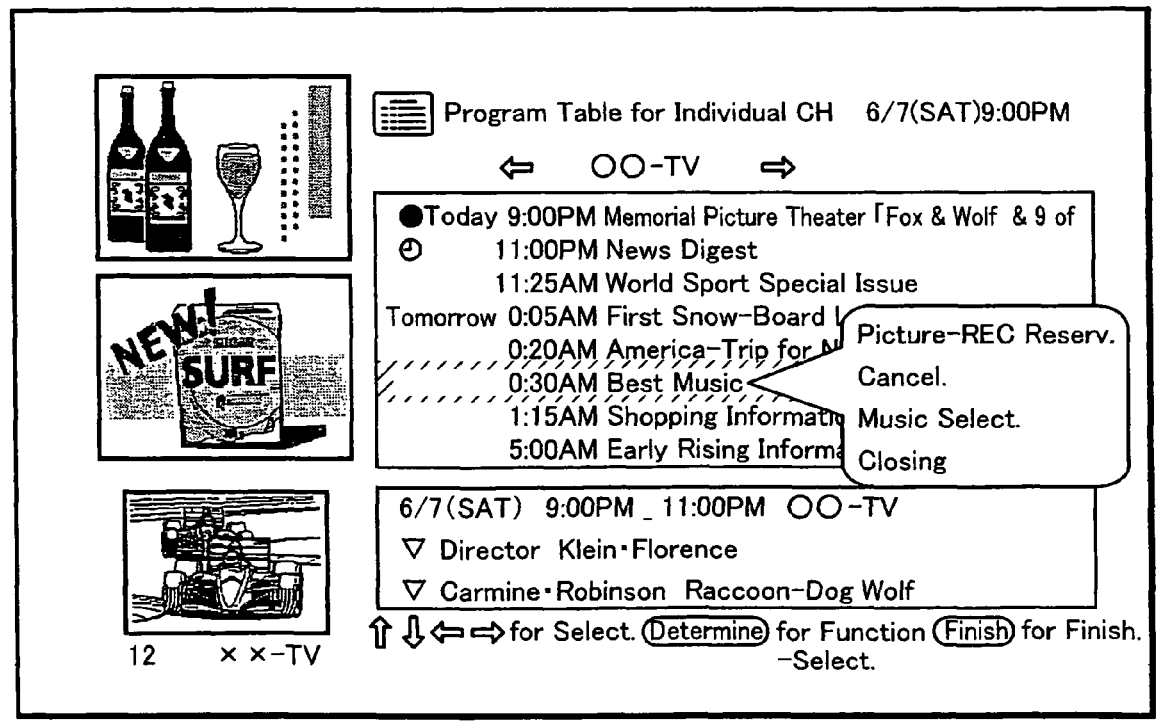

Further, when the selection of a desired program is determined, the picture screen changes as shown in FIG. 2B. In this FIG. 2B, control items of "reserving picture recording", "cancel", "music selection" and "closing" are displayed in a so-called balloon from the column of the selected desired program. Then, the control item is selected by the operation of the upper and lower cursor keys and the determination key.

Figure 3A:
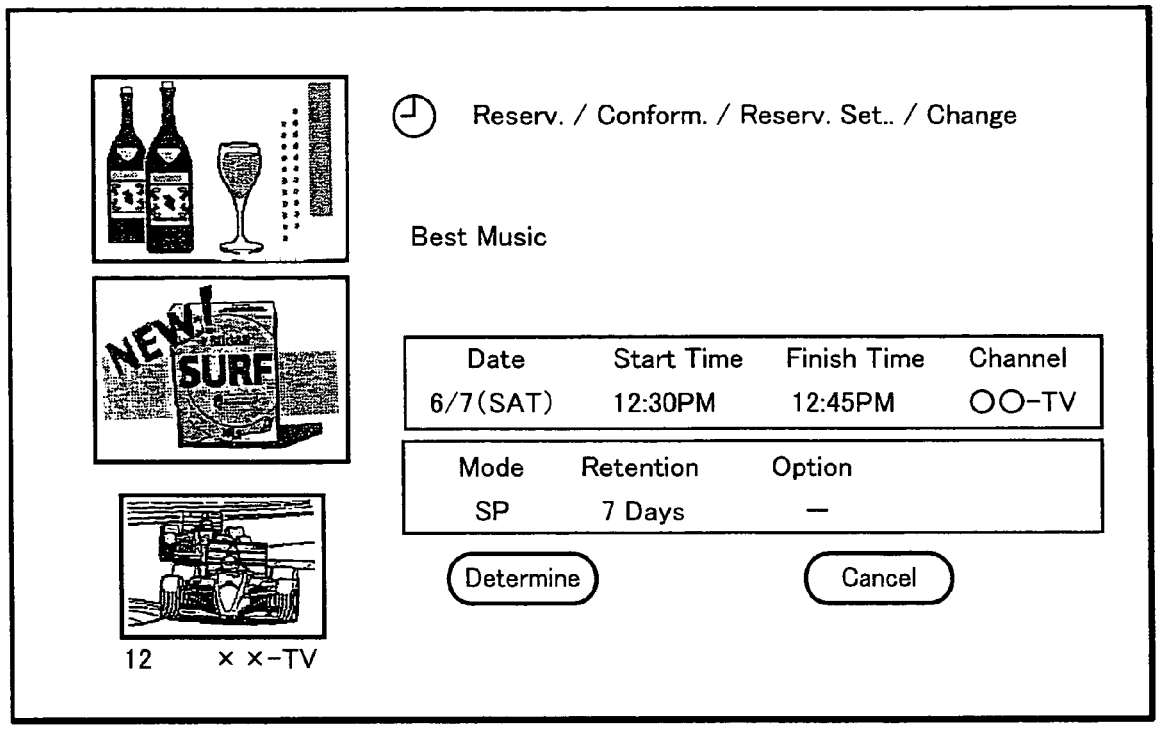
FIGS. 3A and 3B are diagrams showing pictures for carrying out a setting relating to a reservation to be used for the explanation thereof.

When "reserving picture recording" is selected here, a picture for carrying out a setting relating to a reservation is displayed in the receiver 40 such as, for example, shown in FIG. 3A. In FIG. 3A more specifically, the selected program title, date and hour of its broadcast (broadcast time period) and broadcast channel are displayed and further, setting items for a person to use (user) are displayed.

For the setting items for this person to use (user), selection of recording (picture quality) modes of "HQ", "SP", "EP" or the like; retention period; and setting of an option are carried out. Then, for the option, for example, a process is set in case of a broadcast time period which has a possibility to be changed owing to an influence of a previous program, such as "baseball extension".

Figure 3B:
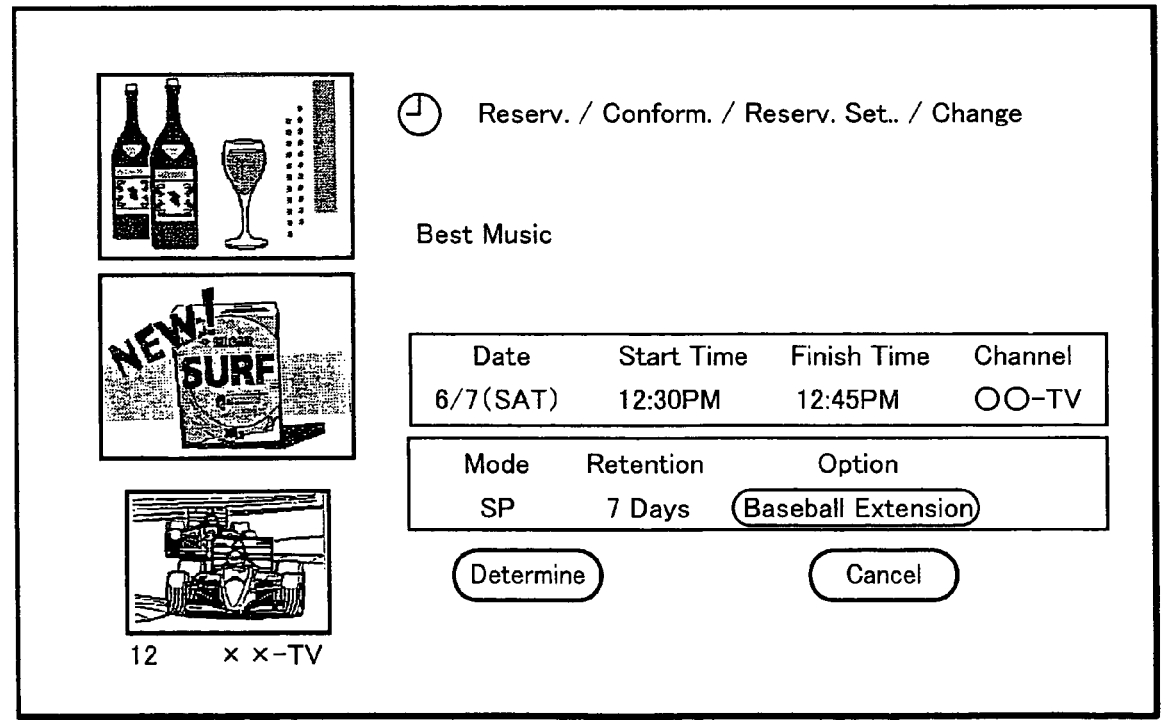

Further, in a case when a process for the aforementioned "baseball extension" is set, a logo of "baseball extension" is displayed in an option column of setting items by a person to use (user) such as, for example, shown in FIG. 3B. Then, in a case when this process is set, a process such as, for example, shown in the flowchart of FIG. 4 is executed just before a recording starts for the aforementioned broadcast time period.

Figure 4:
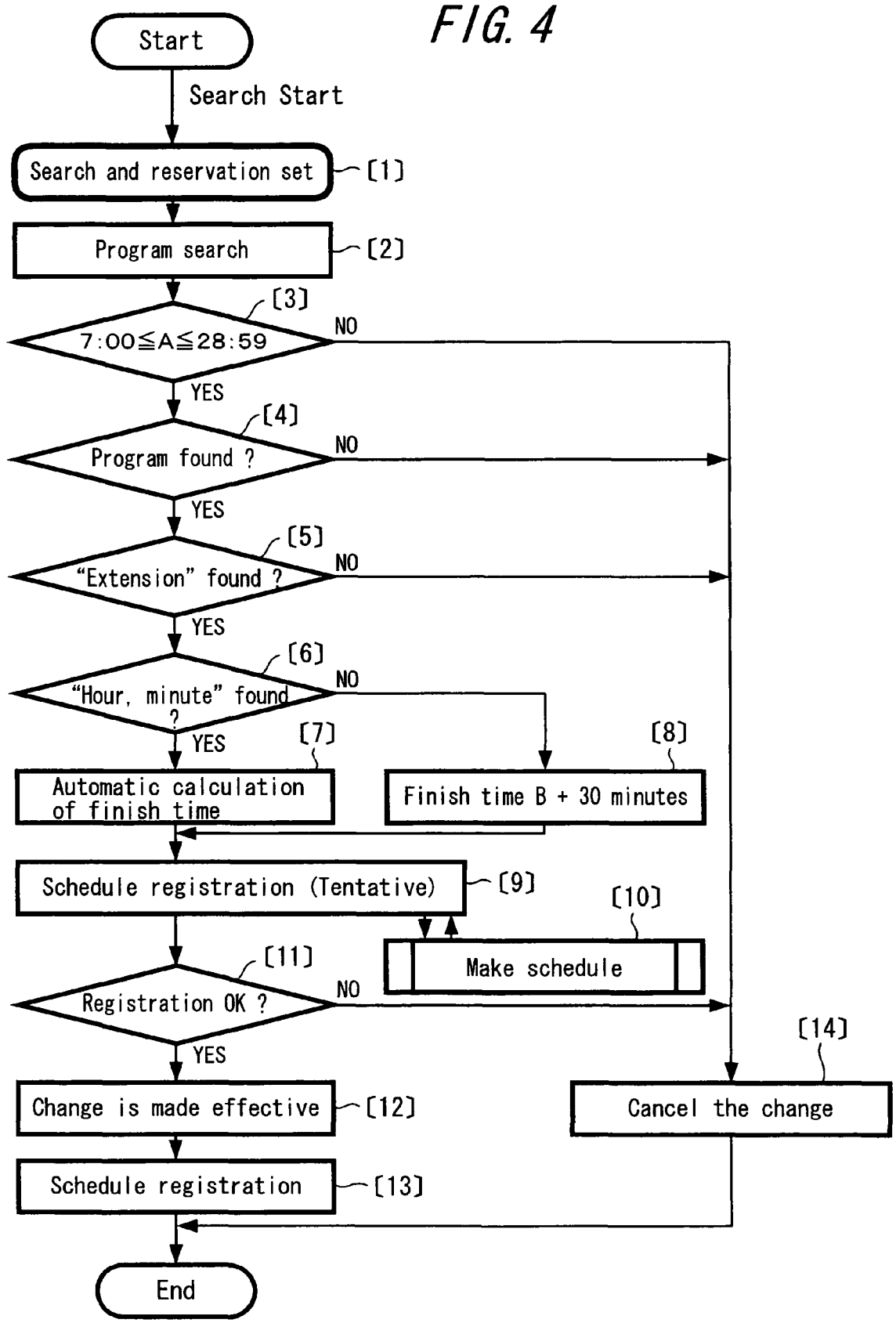
FIG. 4 is a flowchart diagram to be used for the explanation of the processing operation.

More specifically, when the process starts in FIG. 4, a search is carried out in the system first. Then, a process of a search and reservation set is executed in step [1] and a program for which a "baseball extension" process has been set is searched in step [2]. There, a start time: A, a finish time: B and a broadcast station: Z of a program are set.

In next step [3], it is judged whether it is a reservation to which a "baseball extension" process is possible with respect to the start time: A of the program. More specifically, the program for which the "baseball extension" process is possible is a program having start time: A of 7:00 PM to 28:59. Here, 28:59 designates one minute before 5:00 AM at which general program tables are changed.

Also, it is judged in step [4] whether there is a program corresponding to "sport: baseball" in the programs, for example, at 7:00 PM to 9:00 PM in the corresponding broadcast station: Z within an electric program guide. Here, it is judged whether there is a corresponding program according to the genre of the program or the code of the sub-genre included in the EPG data.

In step [5] further, it is judged whether the word "extension" is included in the character strings constituting the electric program guide. Then, when "Yes" is true in all steps [3] to [5], it is judged in step [6] whether a character constituting "hour and/or minute" is included in the character strings constituting the electric program guide.

Here, there is a case where so-called external characters are used for characters constituting "hour" and in this case, the judgment is carried out by discriminating the corresponding external characters. Also, it is possible to discriminate characters constituting "hour and/or minute" and time indicated by the characters according to the external characters and succeeding number sequence thereof.

Then, when the character constituting "hour and/or minute" is judged to exist (Yes) in step [6], an automatic calculation of the finish time is performed in step [7]. More specifically, a maximum extension width Y is calculated as $$Y = D - C$$

by using the finish time: C of the program which includes the word "extension" in the character strings constituting the electric program guide and the aforementioned judged time: D.

Further, the finish time B' of the program for which the "baseball extension" process after responding to the extension is set is calculated as follows:

$$B' = B + Y$$

However, when B'≧29:00 it is calculated as follows:

$$B' = 29:00$$

Also, when the characters constituting "hour and/or minute" are judged not to exist (No) in step [6], the finish time B' of the set program is calculated in step [8] as follows:

$$B' = B + 30 \text{ minutes}$$

In step [9] further, a schedule registration of the calculated time is carried out. However, the schedule registration here is still in a tentative situation. Also, the schedule registration is performed by using a subroutine [10] for making a schedule, which is separately provided, but the detailed explanation thereof will be omitted, because it is not in the scope of the present application.

Then, it is judged in step [11] whether recording is possible according to the tentatively registered schedule. More specifically, in a case when the tentatively registered schedule overlaps another reservation or in a case when there is insufficient capacity for recording the tentatively registered schedule, a recording according to the tentatively registered schedule would not be carried out.

Consequently, in the judgment of step [11], when a recording is possible (Yes) according to the schedule registered tentatively in aforementioned step [9], the change is made to be effective in step [12]. Then, the changed schedule is registered actually in step [13] and the process is ended.

Also, in the judgment of step [11], when the recording is impossible (No) according to the schedule registered tentatively, the change is canceled in step [14] and the process is ended. It should be noted that the change is also canceled in step [14] and the process is ended when either one of steps [3] to [5] is (No).

In this manner, according to the aforementioned apparatus, it is easily possible to remove a fear that a situation may occur in which an end portion of a desired program is not recorded in a case when a broadcast period of a program previous to the desired program is extended.

More specifically, in a case when there exists a program "baseball" before a desired program "drama A" as shown on an upper side of FIG. 5A where the maximum extension thereof is until 9:30, 30 minutes which is the difference from the former finish time 9:00 is calculated as the maximum extension width Y and the finish time of the desired program "drama A" is changed from the former finish time 10:00 to 10:30 as shown on the lower side of FIG. 5A.

However, when the changed finish time 10:30 of the desired program "drama A" overlaps a broadcast time period of another picture-record reserved program "variety" as shown on the lower side of FIG. 5B, that change is canceled and the formerly set content remains unchanged. More specifically, the extension of the previous program does not always occur, so that a decided reservation setting is made to have priority.

Figure 6A:
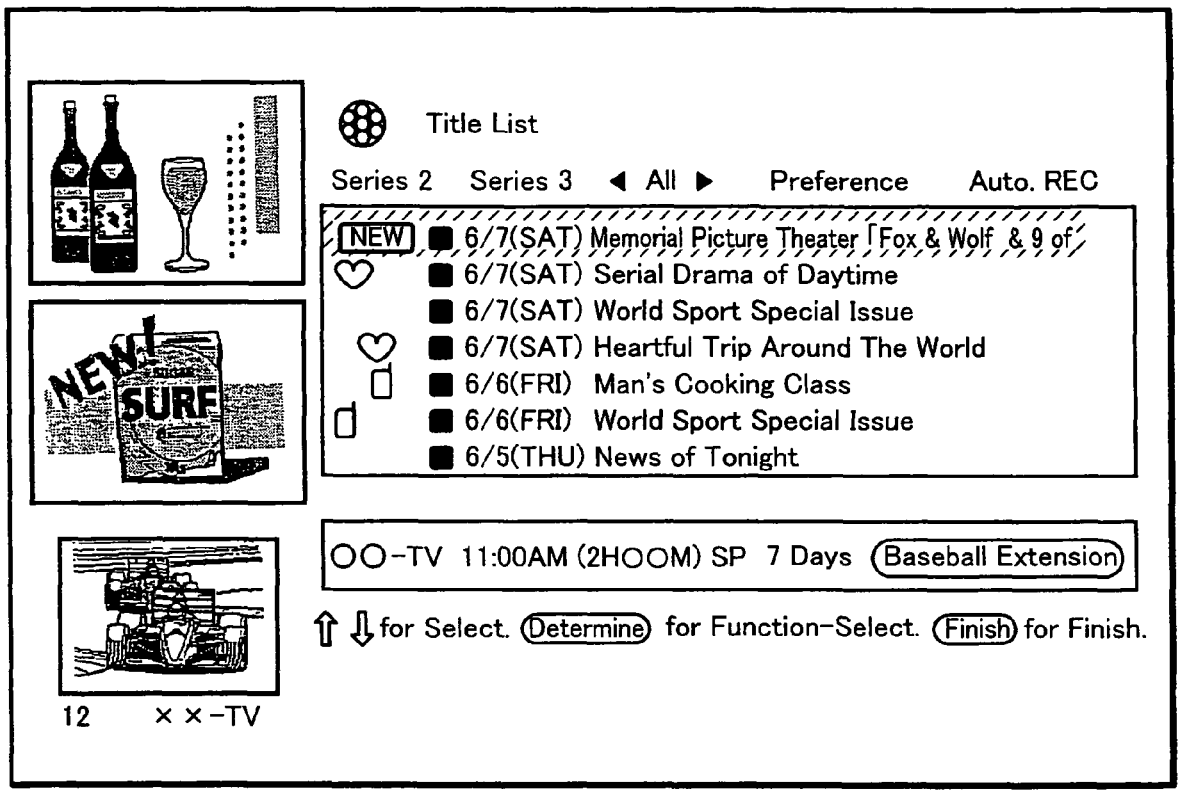
FIGS. 6A and 6B are diagrams showing pictures of a picture screen for a recording title list to be used for the explanation thereof.

Further, in the case of carrying out a reproduction of a recorded program, a picture having a picture screen of a recorded title list is displayed as shown, for example, in FIG. 6A by an operation of a reproduction key (not shown) provided, for example, in the remote control apparatus 50. Then, a desired program is selected according to an operation of the upper and lower cursor keys.

Also, a set content on the picture-record reservation of a program selected by the cursor is displayed on the lower portion of the picture screen. Here, the aforementioned logo "baseball extension" is also displayed. Thus, the possibility that a recording set might have been changed is suggested. Also, in a case when the change was canceled, the fact that the change was not carried out is clearly shown by displaying, for example, a mark "X" overlapped with the logo.

Here, when the broadcast time period overlaps, the change is canceled and the formerly set content remains unchanged in the aforementioned exemplified embodiment, but it can be considered, for example, that the picture recording period is made to be extended in a range not overlapping the broadcast time period of a next set program. More specifically, such a process can be performed by extending the picture recording period until the start time of the next set program.

Figure 6B:
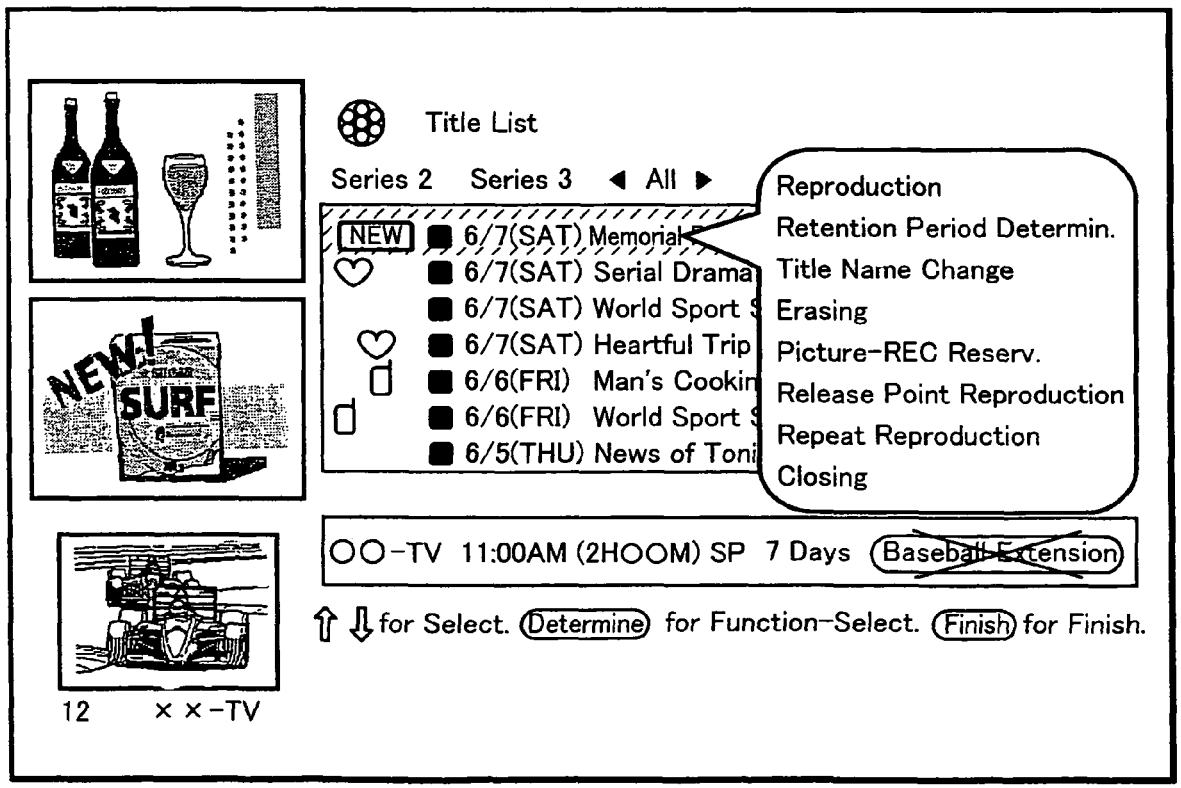

Then, when a selection of a desired program is determined by the operation of the determination key, the picture screen is changed as shown in FIG. 6B. In this FIG. 6B, control items relating to "reproduction" and other reproduction are displayed in a so-called balloon from the selected desired program column. Then, a control item is determined by operations of the upper and lower cursor keys and determination key.

Consequently, according to this exemplified embodiment, it is easily possible to remove a fear that a situation in which an end portion of a desired program is not recorded may occur by searching character strings in a predetermined region of the electric program guide and by changing the set broadcast time period when a predetermined word is included in the character strings.

In this manner, while in a conventional apparatus, there is a fear that a situation in which an end portion of the desired program is not recorded may occur in a case when a broadcast period of a program which is previous to a desired program is extended and further while it was not possible to realize a way to overcome this problem easily, it becomes possible according to the present invention to overcome these problems easily.

In this manner, according to the aforementioned program recording apparatus, it is possible to remove a fear that a situation may occur in which an end portion of the desired program is not recorded by providing setting means for setting a record of the desired program based on at least a broadcast time period and a broadcast channel; searching means for searching a character string in a predetermined region of the electric program guide including the set broadcast time period and broadcast channel; and control means for changing the set broadcast time period when a predetermined word is included in the character string.

Also, according to the aforementioned program recording method, it is possible to remove a fear that a situation may occur in which an end portion of the desired program is not recorded in a situation when the desired program recording is set based on at least a broadcast time period and a broadcast channel by searching a character string in a predetermined region of the electric program guide including the set broadcast time period and broadcast channel, and carrying out a control for changing the broadcast time period when a predetermined word is included in the character string.

It should be noted that the present invention is not restricted by the exemplified embodiments explained above and it is possible to take various modifications without departing from the spirit of the present invention.

The invention claimed is:

1. A program recording apparatus which obtains an electric program guide and receives and records a desired program by using the obtained electric program guide, comprising:
   a setting unit operable to set recording of the desired program based on at least a broadcast time period and a broadcast channel;
   a searching unit operable to search a character string in a predetermined region of the electric program guide including the set broadcast time period to record and broadcast channel to record, and to discriminate a number sequence subsequent to a predetermined word included in the character string when the predetermined word is searched; and
   a controller operable to change the set broadcast time period to record to a new time period to record when the predetermined word is included in the character string, wherein the new time period to record has a termination point later than a termination point of the set broadcast time period to record and the termination point of the new time period to record is determined based on the value of the discriminated number sequence;

the controller being operable to time-extend the termination point of the set broadcast time period to record in response to the value of the discriminated number sequence, in a range not overlapping another set broadcast time period to record, wherein, when the termination point of the new time period to record is later than a starting point of the another set broadcast time period to record, the controller time-extends the set broadcast time period to record until the starting point of the another set broadcast time period to record;

the controller being operable to display on a display unit, when the predetermined word is included in the character string and a process to change the set broadcast time period to record is set, (i) an indication that a change was not carried out, when a change is canceled in carrying out the process; and (ii) an indication of a possibility the set broadcast time period to record might have been changed, other than when a change is canceled in carrying out the process.

2. A program recording apparatus according to claim 1, wherein the predetermined word is "extension".

3. A program recording apparatus according to claim 1, wherein the controller is operable to time-extend the termination point of the set broadcast time period to record by a predetermined amount when the number sequence subsequent to the predetermined word cannot be discriminated.

4. A program recording apparatus according to claim 1, wherein the controller does not change the set broadcast time period to record to the new time period to record when the new time period to record overlaps with the another set broadcast time period to record.

5. A program recording apparatus according to claim 4, wherein, when the set broadcast time period to record is not changed, the controller causes a display to be made indicating that the set broadcast time period to record was not changed in addition to a display of the desired program set for recording.

6. A program recording apparatus according to claim 1, wherein the setting unit further sets the change from the set broadcast time period to record to the new time period to record when the predetermined word is included in the character string.

7. A program recording apparatus according to claim 1, wherein the controller changes the set broadcast time period to record to the new time period to record just before the desired program recording starts when the predetermined word is included in the character string.

8. A program recording apparatus according to claim 1, wherein the controller does not change the set broadcast time period to record to the new time period to record when the program recording apparatus would have an insufficient capacity at the new time period.

9. A program recording method for receiving and recording a desired program, the recording of which is set based on at least a broadcast time period and a broadcast channel, the method comprising:

obtaining an electric program guide;

in a situation when the desired program recording is set, searching a character string in a predetermined region of the electric program guide including the set broadcast time period to record and broadcast channel to record, wherein the searching includes discriminating a number sequence subsequent to a predetermined word included in the character string when the predetermined word is searched;

determining whether to change the set broadcast time period to record to a new time period to record when the predetermined word is included in the character string and based on whether a time-extended termination point of the set broadcast time period to record, which is determined in response to the value of the discriminated number sequence, is in a range not overlapping another set broadcast time period to record, wherein the new time period to record has a termination point later than a termination point of the set broadcast time period to record and the termination point of the new time period to record is determined based on the value of the discriminated number sequence, wherein, when the termination point of the new time period to record is later than a starting point of the another set broadcast time period to record, the set broadcast time period to record is time-extended until the starting point of the another set broadcast time period to record;

wherein, when the predetermined word is included in the character string and a process to change the set broadcast time period to record is set, controlling, by a processor, display of (i) an indication that a change was not carried, when a change is canceled in carrying out the process; and (ii) an indication of a possibility the set broadcast time period to record might have been changed, other than when a change is canceled in carrying out the process.

10. A program recording method according to claim 9, wherein the predetermined word is "extension".

11. A program recording method according to claim 9, wherein the termination point of the set broadcast time period to record is time-extended by a predetermined amount when the number sequence subsequent to the predetermined word cannot be discriminated.

12. A program recording method according to claim 9, wherein the step of changing the set broadcast time period to record to the new time period to record is not carried out when the new time period to record overlaps with the another set broadcast time period to record.

13. A program recording method according to claim 12, further comprising: displaying an indication that the step of changing the set broadcast time period to record to the new time period to record was not carried out along with the desired program set for recording when the step of changing the set broadcast time period to record is not carried out.

14. A program recording method according to claim 9, wherein the setting step further includes setting the change from the set broadcast time period to record to the new time period to record when the predetermined word is included in the character string.

15. A program recording method according to claim 9, wherein the changing step includes changing the set broadcast time period to record to the new time period to record just before the desired program recording starts when the predetermined word is included in the character string.

16. A program recording method according to claim 9, wherein the step of changing the set broadcast time period to record to the new time period to record is not carried out when an insufficient recording capacity would exist at the new time period to record.

* * * * *